United States Patent
Kamasuka

(10) Patent No.: US 9,888,145 B2
(45) Date of Patent: Feb. 6, 2018

(54) SYSTEM AND METHOD ENABLING RESETTING OF A COUNTER ASSOCIATED WITH A COMPONENT OF AN IMAGE PROCESSING DEVICE

(71) Applicants: Canon Information and Imaging Solutions, Inc., Melville, NY (US); Canon U.S.A., Inc., Melville, NY (US)

(72) Inventor: Atsushi Kamasuka, Matsudo (JP)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 0 days.

(21) Appl. No.: 14/816,823

(22) Filed: Aug. 3, 2015

(65) Prior Publication Data

US 2017/0041498 A1  Feb. 9, 2017

(51) Int. Cl.
*G06F 3/12* (2006.01)
*H04N 1/327* (2006.01)
*H04N 1/00* (2006.01)

(52) U.S. Cl.
CPC ..... *H04N 1/32771* (2013.01); *H04N 1/00015* (2013.01); *H04N 1/00204* (2013.01);
(Continued)

(58) Field of Classification Search
CPC ......... H04N 1/32771; H04N 1/00015; H04N 1/00204; H04N 1/00344; H04N 1/00464;
(Continued)

(56) References Cited

U.S. PATENT DOCUMENTS 4,860,052 A   8/1989   Ito et al.
5,021,828 A   6/1991   Yamaguchi et al.
(Continued)

FOREIGN PATENT DOCUMENTS

EP   2239141 A1   10/2010

OTHER PUBLICATIONS

"LEXMARK—C734 and C736 Series Maintenance Guide," Lexmark International, Inc., May 2009.
(Continued)

*Primary Examiner* — Benny Q Tieu
*Assistant Examiner* — Juan M Guillermety
(74) *Attorney, Agent, or Firm* — Canon U.S.A., Inc. IP Division

(57) ABSTRACT

Systems, methods, and computer-readable media are provided. Some embodiments include receiving, at a computing system from an image processing device, a request to access a resource. The computing system obtains information that identifies a component installed on the image processing device as a replacement component. The computing system obtains information indicating a count value of a counter associated with the component. The computing system determines whether the counter has been reset based on the information indicating the count value of the counter. In response to determining that the counter has not been reset, the computing system sends, to the image processing device, the resource including information for presentation as an interface element in a graphical user interface on a display of the image processing device, the interface element enabling a user to reset the counter by selecting the interface element.

19 Claims, 8 Drawing Sheets

(52) U.S. Cl.
CPC ..... *H04N 1/00344* (2013.01); *H04N 1/00464* (2013.01); *H04N 1/00832* (2013.01); *H04N 1/00917* (2013.01); *H04N 2201/0094* (2013.01)

(58) Field of Classification Search
CPC ........... H04N 1/00832; H04N 1/00917; H04N 1/00352; H04N 1/00824; H04N 1/00472; H04N 1/00477; G06F 3/1285; G06F 3/1288; G06F 3/1292; G06F 3/1218; G06F 3/1219; G06F 3/122
USPC ...................................................... 358/1.15
See application file for complete search history.

(56) References Cited

U.S. PATENT DOCUMENTS

| | | |
|---|---|---|
| 5,066,978 A | 11/1991 | Watari et al. |
| 5,546,163 A | 8/1996 | Asai et al. |
| 5,850,583 A | 12/1998 | Song et al. |
| 5,877,692 A | 3/1999 | Watanabe et al. |
| 5,893,005 A | 4/1999 | Ogura |
| 5,903,285 A | 5/1999 | Ju et al. |
| 6,108,499 A | 8/2000 | Cernusak |
| 6,782,495 B2 | 8/2004 | Bernklau-Halvor |
| 6,967,733 B1 | 11/2005 | Minowa |
| 7,440,706 B2 | 10/2008 | Moriyama et al. |
| 7,650,085 B2 | 1/2010 | Kehoe et al. |
| 7,734,200 B2 | 6/2010 | Sugiyama et al. |
| 7,734,209 B2 | 6/2010 | Pathak et al. |
| 7,949,263 B2 | 5/2011 | Nakamura |
| 8,059,974 B2 | 11/2011 | Yamaguchi |
| 8,099,332 B2 | 1/2012 | Lemay et al. |
| 8,312,324 B2 | 11/2012 | Foley et al. |
| 8,326,161 B2 | 12/2012 | Ikeno |
| 2002/0016780 A1 | 2/2002 | Shah |
| 2003/0066340 A1* | 4/2003 | Hassenflug ............... G01F 1/28 340/605 |
| 2003/0103233 A1* | 6/2003 | Struble .............. H04N 1/00832 358/1.15 |
| 2003/0110412 A1 | 6/2003 | Neville |
| 2003/0139982 A1 | 7/2003 | Schwartz et al. |
| 2003/0210426 A1 | 11/2003 | Kai |
| 2004/0138964 A1* | 7/2004 | Okada ...................... G06F 8/61 705/26.1 |
| 2005/0270560 A1* | 12/2005 | Ferlitsch ............... G06F 3/1208 358/1.15 |
| 2007/0028061 A1* | 2/2007 | Takehana ........... H04N 1/00832 711/156 |
| 2007/0171457 A1 | 7/2007 | Murahashi et al. |
| 2007/0180159 A1 | 8/2007 | Takahashi |
| 2009/0089076 A1* | 4/2009 | Asakimori ......... H04N 1/00832 705/305 |
| 2009/0187900 A1 | 7/2009 | Nakamoto |
| 2009/0317096 A1* | 12/2009 | Odaira ............... G03G 15/6529 399/21 |
| 2009/0324260 A1 | 12/2009 | Andou |
| 2010/0020357 A1* | 1/2010 | Amino .................. G06F 3/1219 358/1.15 |
| 2010/0198728 A1 | 8/2010 | Aabye et al. |
| 2010/0272450 A1 | 10/2010 | Brown et al. |
| 2011/0051189 A1* | 3/2011 | Suga .................. H04N 1/00832 358/1.15 |
| 2011/0149329 A1* | 6/2011 | Moro ..................... G06F 3/1229 358/1.13 |
| 2011/0216359 A1 | 9/2011 | Kamisuwa et al. |
| 2011/0293298 A1 | 12/2011 | Doi |
| 2012/0188592 A1 | 7/2012 | Handley et al. |
| 2013/0249991 A1* | 9/2013 | Iwahara ................ G06F 3/1203 347/16 |
| 2014/0025759 A1 | 1/2014 | Miller |
| 2015/0032647 A1* | 1/2015 | Lachman ............. G06Q 30/018 705/317 |
| 2015/0312427 A1* | 10/2015 | Roulland ........... H04N 1/00474 358/1.15 |
| 2016/0037003 A1* | 2/2016 | Oku ................... H04N 1/00344 358/406 |

OTHER PUBLICATIONS

"Clearing the Maintenance Count and Service Message: HP LaserJets," PrinterTechs.com, Inc., (URL: http://www.printertechs.com/printer-troubleshooting/clearing-maintenance-count).
"RICOH @Remote for Printing Devices," Ricoh Company Ltd., 2014.
"Copier/Duplicator with Automatic or Semi-Automatic Service Caller," IP.com I, LLC., Apr. 4, 2004.
"Xerox CentreWare Web—Evaluation Guide," Xerox Corporation, Dec. 2014.
Office Action (Non-Final Rejection) for U.S. Appl. No. 13/871,949, dated Sep. 15, 2014.
Office Action (Final Rejection) for U.S. Appl. No. 13/871,949, dated Apr. 30, 2015.
Notice of Allowability for U.S. Appl. No. 13/871,949, dated Nov. 9, 2015.

* cited by examiner

SYSTEM AND METHOD ENABLING RESETTING OF A COUNTER ASSOCIATED WITH A COMPONENT OF AN IMAGE PROCESSING DEVICE

BACKGROUND OF THE INVENTION

Field of the Invention

The present invention relates to a system and method enabling resetting of a counter associated with a component of an image processing device.

Description of the Related Art

Modern image processing devices, such as multifunction peripherals, printers, copiers, or other devices, include various components. Commonly, an image processing device includes counters associated with respective components of the image processing device. Counters may be used for monitoring usage of the image processing device and scheduling maintenance. A counter may store a value representing the number of times the component associated with the counter has operated. During maintenance, if the component is replaced, a counter associated with the component may need to be reset to an initial value. Failure to reset the counter may result in an inaccurate counter which may inhibit effective monitoring and maintenance scheduling for the image processing device.

BRIEF SUMMARY OF THE INVENTION

Systems, methods, and computer-readable media enabling resetting of a counter associated with a component of an image processing device are disclosed.

Some embodiments of the invention include receiving, at a computing system from an image processing device, a request to access a resource. The computing system obtains information that identifies a component installed on the image processing device as a replacement component. The computing system obtains information indicating a count value of a counter associated with the component. The computing system determines whether the counter has been reset based on the information indicating the count value of the counter. In response to determining that the counter has not been reset, the computing system sends, to the image processing device, the resource including information for presentation as an interface element in a graphical user interface on a display of the image processing device, the interface element enabling a user to reset the counter by selecting the interface element.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

Figure 1:
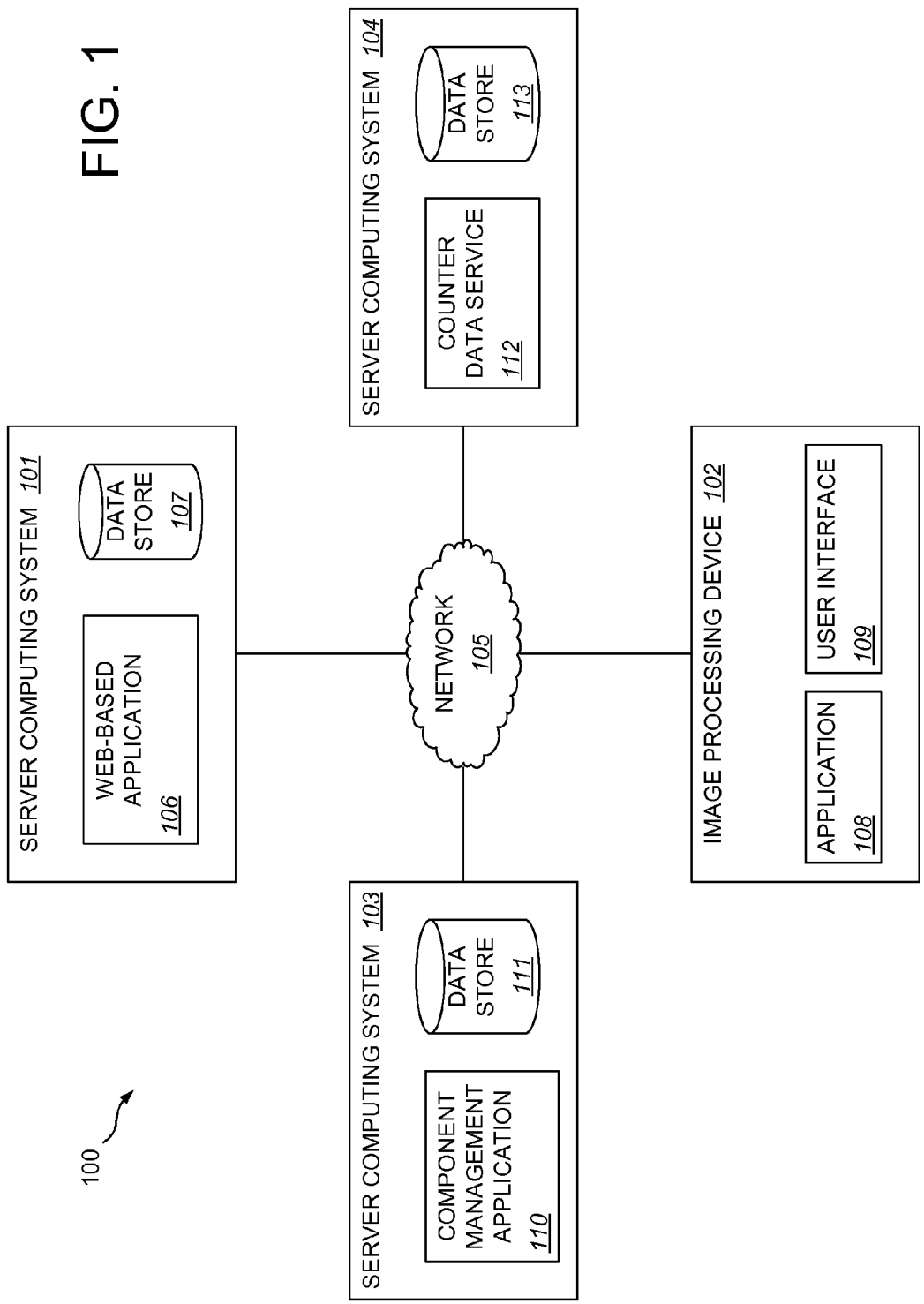
FIG. 1 illustrates an example network environment.

Embodiments of the present invention are described with reference to the drawings. FIG. 1 illustrates an example network environment 100. A server computing system 101 having a web-based application 106 and a data store 107, an image processing device 102 having an application 108 and a user interface 109, a server computing system 103 having a component management application 110 and a data store 111, and a server computing system 104 having a counter data service 112 and a data store 113 are connected to a network 105.

The server computing system 101 includes hardware, software, or both for providing the functionality of the server computing system 101. The server computing system 101 may include one or more servers. For example, the server computing system 101 may include one or more application(s) servers, web servers, file servers, or database servers. In some embodiments, the server computing system 101 is unitary. In some embodiments, the server computing system 101 is distributed. The server computing system 101 may span multiple locations. The server computing system 101 may span multiple machines.

In some embodiments, the server computing system 101 performs one or more steps of one or more methods described or illustrated herein. In some embodiments, the server computing system 101 provides functionality described or illustrated herein. In some embodiments, software running on the server computing system 101 performs one or more steps of one or more methods described or illustrated herein or provides functionality described or illustrated herein. Particular embodiments include one or more portions of the server computing system 101.

The server computing system 101 includes the web-based application 106 and the data store 107. These components of the server computing system 101 reside in the server computing system 101 in any suitable manner. For example, these components may reside on one or multiple servers. In some embodiments, one or both of these components may be provided as part(s) of a software application. In some embodiments, one or both of these components may be provided as a stand-alone software application. In some embodiments, the web-based application 106 executing on the server computing system 101 performs one or more steps of one or more methods described or illustrated herein or provides functionality described or illustrated herein. For example, programs of the web-based application 106 may include instructions that, when executed by one or more processors, cause the one or more processors to perform one or more operations described with respect to one or more of FIG. 2, FIG. 3 and FIG. 4.

The server computing system 101 provides access to the web-based application 106. The web-based application 106 includes programs and related data. The web-based application 106 may receive hypertext transfer protocol (HTTP) requests and provide HTTP responses. For example, the web-based application 106 may serve content in the form of a web page in response to a request from a web browser. The web page may be static or dynamic and may comprise Hyper Text Markup Language (HTML) files, or other suitable files, executable code, such as JAVASCRIPT, form elements, images, or other content. One or more elements of the web page content may be stored at the server computing system 101. In some embodiments, the web-based application 106 uses Simple Object Access Protocol (SOAP) to receive and send messages.

In some embodiments, the web-based application 106 provides functionality for maintaining and accessing information stored in the data store 107. The web-based application 106 may perform various operations with respect to the data store 107. Examples of operations include adding entries to the data store 107; deleting entries from the data store 107; modifying entries in the data store 107; searching for entries in the data store 107; and retrieving entries from the data store 107. The information in the data store 107 may be organized in any suitable manner and may be organized for any suitable reason, such as for implementing the functionality of the web-based application 106.

In some embodiments, the server computing system 101 interacts with one or more entities on the network 105. The server computing system 101 may use any suitable protocol(s), standard(s), data exchange format(s), or combination(s) of these, to communicate with and send/receive information to/from one or more of the image processing device 102, the server computing system 103, and the server computing system 104. In some embodiments, the server computing system 101 includes programs and related data for generating and sending a resource (such as a web page, a program, or other suitable resource) to the image processing device 102. In some embodiments, the server computing system 101 includes programs and related data for communicating with and obtaining information from the server computing system 103 and the server computing system 104.

The image processing device 102 includes hardware, software, or both for providing the functionality of the image processing device 102. The image processing device 102 may be a multifunction peripheral having printing, scanning, copying, and other functions. However, it will be understood that various other implementations of an image processing device are within the scope of the present invention. For example, according to some embodiments, other devices (for example, a printer or a scanner) or computing systems (for example, a computer connected to a printer and/or a scanner) may be implemented as the image processing device.

The image processing device 102 includes the application 108. The application 108 includes programs and related data. In some embodiments, the application 108 executing on the image processing device 102 performs one or more operations described or illustrated herein or provides functionality described or illustrated herein. For example, programs of the application 108 may include instructions which, when executed by one or more processors, cause the one or more processors to perform one or more operations described or illustrated herein. In some embodiments, the application 108 executing on the image processing device 102 interacts with one or more entities on the network 105. For example, the application 108 executing on the image processing device 102 may send requests to and receive information from the server computing system 101. In some embodiments, the application 108 executing on the image processing device 102 presents information on a display of the image processing device 102.

The image processing device 102 includes the user interface 109. The user interface 109 includes hardware, software, or both for providing the functionality of the user interface 109. The user interface 109 may include an operation panel. The user interface 109 may output signals and receive input signals via the operation panel so as to facilitate interaction between a user and the image processing device 102. An operation panel may include a hard key panel and/or a touch sensitive display. A user may provide user input operations via the hard key panel and/or the touch sensitive display to control the image processing device 102 via the operation panel. For example, the user may press one or more hard buttons to issue one or more commands. Further by way of example, a user may provide a touch input to an interface element displayed on the display to issue a command and/or to make a selection. Moreover, the image processing device 102 may output information to the user and issue requests by presenting text or graphical objects on a display of the image processing device 102.

In some embodiments, a browser may execute on the image processing device 102. According to some embodiments, the application 108 comprises a browser. In some embodiments, the user interface 109 comprises information displayed by the browser. The browser may be a web browser, and may be used to access a resource, such as a web page. The browser may enable a user to display and interact with text, images, form elements, or other information typically located on a web page served by a web server on the World Wide Web or a local area network. The browser may support various types of downloadable, executable, software modules, such as applets or plug-ins. For example, the browser may incorporate a virtual machine configured to execute a program, such as a JAVA applet, embedded in a web page accessed by the browser. The image processing device 102 may have various add-ons, plug-ins, or other extensions for use in or with the browser.

In some embodiments, the image processing device 102 stores counter information. For example, an area of memory on the image processing device 102 may be used as a counter associated with a particular component of the image processing device 102. In some embodiments, the counter stores a single value representing the number of times the component associated with the counter has operated. The stored value may be incremented by one. For example, the value may be incremented by one when the particular component associated with the counter is operated. The stored value may be reset to zero. For example, the value may be reset to zero when the component associated with the counter is replaced by a new component. In some embodiments, multiple counters are provided, each counter associated with a respective particular component of the image processing device 102.

A counter associated with a component installed on the image processing device 102 may be reset by a user operation. By way of example, a user may provide, via the user interface 109, one or more inputs for resetting the counter. The user may provide the one or more inputs for resetting the counter while the image processing device 102 is operating in an operation mode for performing component removal and component installation on the image processing device 102. For example, the image processing device 102 may be in a service mode and the user may provide one or more inputs via the user interface 109 that cause the counter to be reset.

The server computing system 103 includes hardware, software, or both for providing the functionality of the server computing system 103. The server computing system 103 may include one or more servers. For example, the server computing system 103 may include one or more application(s) servers, web servers, file servers, or database servers. In some embodiments, the server computing system 103 is unitary. In some embodiments, the server computing system 103 is distributed. The server computing system 103 may span multiple locations. The server computing system 103 may span multiple machines.

The server computing system 103 includes the component management application 110 and the data store 111. These components of the server computing system 103 reside in the server computing system 103 in any suitable manner. For example, these components may reside on one or multiple servers. In some embodiments, one or both of these components may be provided as part(s) of a software application. In some embodiments, one or both of these components may be provided as a stand-alone software application.

The server computing system 103 provides access to the component management application 110. The component management application 110 includes programs and related data. The component management application 110 may include one or more programs for managing inventory data for one or more image processing devices. By way of example, the component management application 110 may maintain inventory data associated with one or more multifunction peripheral(s), printer(s), scanner(s), fax machine(s), or other suitable device(s). The inventory data may include information associated with image processing device components included as inventory items. In some embodiments, the inventory data includes respective quantity information for each type of component included in inventory. For example, for each component type, the corresponding quantity information may indicate a value representing the number of components of that type in the inventory. In some embodiments, the inventory data includes respective component identification information for each component in inventory. For example, for each component, the corresponding component identification information may be information that identifies the component. In some embodiments, the inventory data includes information associated with a component that is to be or that currently is installed on an image processing device. For example, the inventory data may include information that identifies a component to be installed or that currently is installed on an image processing device, information that identifies the image processing device on which the component is to be installed or has been installed, other suitable information, or a combination of two or more of these.

In some embodiments, the component management application 110 executing on the server computing system 103 provides functionality for maintaining inventory data associated with the image processing device 102. For example, the inventory data may include information that identifies a component that is to be or that currently is installed on the image processing device 102. The component may be installed on the image processing device 102 as a replacement component. The information that identifies the component may be component identification information, such as a component identifier. Further by way of example, the inventory data may include information that identifies the image processing device 102, such as a device identifier.

In some embodiments, the component management application 110 provides functionality for maintaining and accessing information stored in the data store 111. The component management application 110 may perform various operations with respect to the data store 111. Examples of operations include adding entries to the data store 111; deleting entries from the data store 111; modifying entries in the data store 111; searching for entries in the data store 111; and retrieving entries from the data store 111. In some embodiments, the component management application 110 provides functionality for managing inventory data in the data store 111. For example, the component management application 110 may perform one or more operations to add, delete, modify, search for, or retrieve one or more of the following in the data store 111: information associated with a component installed on the image processing device 102, information that identifies a component installed on the image processing device 102, information that identifies the image processing device 102, or other suitable information.

The information in the data store 111 may be organized in any suitable manner. For example, inventory data in the data store 111 may be organized based on or in accordance with any suitable information. By way of example and not by way of limitation, the inventory data may be organized according to: component type; the image processing device on which a component is installed; physical location of the image processing device; the organization/enterprise associated with the image processing device; the date and/or time of component installation; other suitable information; or a combination of two or more of these. The information in the data store 111 may be organized according to one or more settings of the component management application 110, including default setting(s) or setting(s) based on one or more inputs indicating one or more user selections.

The component management application 110 executing on the server computing system 103 may update inventory data in the data store 111 in response to receiving information indicating the occurrence of an event. In some embodiments, the component management application 110 updates the inventory data based on information indicating a component has been ordered. In some embodiments, the component management application 110 updates the inventory data based on information indicating a component has been installed on an image processing device. In response to receiving information indicating the occurrence of an event that triggers an update of the inventory data, the component management application 110 performs one or more operations to update the inventory data in the data store 111 based on the occurrence of the event. For example, the component management application 110 may perform one or more operations for adding, deleting, modifying, searching for, or retrieving one or more entries in the data store 111. In some embodiments, in response to receiving the information indicating the occurrence of the event, the component management application 110 decrements, by one, information in the data store 111 that indicates a quantity of a specified component in inventory (for example, based on the specified component having been ordered).

The information indicating the occurrence of the event may be received at the server computing system 103 from a computing system. In some embodiments, the information indicating occurrence of the event is an instruction based on one or more inputs provided by a user at the computing system. Information included in the instruction may be based on one or more inputs a user provided via an interface of the computing system. Moreover, the instruction may be issued in response to one or more inputs indicating one or more user selections.

By way of example, the component management application 110 executing on the server computing system 103 may provide web server functionality. And, in response to a request to access a resource, the component management application 110 may send a web page to the computing system. Based on one or more inputs via a user interface of the computing system, a browser executing on the computing system may send the instruction to the server computing system 103.

Further by way of example, the component management application 110 executing on the server computing system 103 may receive the instruction from a mobile computing device. The mobile computing device may be a personal digital assistant (PDA), a mobile telephone, a laptop, a notebook computer system, a tablet computer system, or other suitable mobile computing device. Based on one or more inputs via a user interface of the mobile computing device, an application executing on the mobile computing device may send the instruction to the server computing system 103.

In some embodiments, the information indicating the occurrence of the event is received at the server computing system 103 from the image processing device 102. For example, the information indicating the occurrence of the event may be based on one or more inputs provided by a user via an operation panel of the image processing device 102. Moreover, the information indicating the occurrence of the event may be sent to the server computing system 103 based on a sensor of the image processing device 102 detecting that a component has been installed on the image processing device 102.

The server computing system 104 includes hardware, software, or both for providing the functionality of the server computing system 104. The server computing system 104 may include one or more servers. For example, the server computing system 104 may include one or more application(s) servers, web servers, file servers, or database servers. In some embodiments, the server computing system 104 is unitary. In some embodiments, the server computing system 104 is distributed. The server computing system 104 may span multiple locations. The server computing system 104 may span multiple machines.

The server computing system 104 includes the counter data service 112 and the data store 113. These components of the server computing system 104 reside in the server computing system 104 in any suitable manner. For example, these components may reside on one or multiple servers. In some embodiments, one or both of these components may be provided as part(s) of a software application. In some embodiments, one or both of these components may be provided as a stand-alone software application.

The server computing system 104 provides access to the counter data service 112. The counter data service 112 includes programs and related data. The counter data service 112 may include one or more programs for obtaining and managing counter data for one or more image processing devices. By way of example, the counter data service 112 may maintain counter data associated with one or more multifunction peripheral(s), printer(s), scanner(s), fax machine(s), or other suitable device(s). In some embodiments, the server computing system 104 includes programs and related data for communicating with and obtaining information from the image processing device 102. The server computing system 104 may use any suitable protocol(s), standard(s), data exchange format(s), or combination(s) of these, to communicate with and send/receive information to/from the image processing device 102.

In some embodiments, the counter data includes counter information associated with image processing device components. An image processing device may include various components for providing, for example, scanning and/or printing functionality. By way of example, an image processing device may include one or more motors, gears, transfer belts, transfer rollers, or other suitable component(s) that operate during a scan operation. Further by way of example, an image processing device may include one or more photosensitive drums, transfer belts, transfer rollers, motors, gears, or other suitable component(s) that operate during a print operation. The image processing device may store counter information for one or more components of the image processing device. For example, an area of memory on the image processing device may be used as a counter associated with a particular component of the image processing device. In some embodiments, the counter stores a single value representing the number of times the component associated with the counter has operated. The stored value may be incremented by one. For example, the value may be incremented by one when the particular component associated with the counter is operated. The stored value may be reset to zero. For example, the value may be reset to zero when the component associated with the counter is replaced by a new component. In some embodiments, multiple counters are provided, each counter associated with a respective particular component of the image processing device. In some embodiments, the counter data service 112 executing on the server computing system 104 obtains respective counter information for each of one or more components of an image processing device. For example, for each of the one or more components, the corresponding counter information may indicate a value representing the number of times the component associated with the counter has operated.

In some embodiments, the counter data service 112 executing on the server computing system 104 obtains and manages component identification information. For example, for each component for which counter information is obtained, the counter data service 112 may also obtain corresponding component identification information, which may be information that identifies the component. In some embodiments, the counter data service 112 executing on the server computing system 104 stores the counter information for a component and the component identification information that identifies that component in the data store 113 such that the counter information and the corresponding component identification information are associated with each other in the data store 113.

In some embodiments, the counter data service 112 executing on the server computing system 104 obtains and manages device identification information. For example, for each component for which counter information is obtained, the counter data service 112 may also obtain corresponding device identification information, which may be information that identifies the image processing device on which the component is installed. In some embodiments, the counter data service 112 executing on the server computing system 104 stores the counter information for a component and the device identification information that identifies the image processing device on which the component is installed in the data store 113 such that the counter information and the corresponding device identification information are associated with each other in the data store 113.

In some embodiments, the counter data service 112 executing on the server computing system 104 provides functionality for maintaining counter data associated with the image processing device 102. For example, the counter data may include counter information for each of one or more components installed on the image processing device 102. Further by way of example, the counter data service 112 may also maintain respective component identification information, such as a component identifier, for each of the one or more components. Further by way of example, the counter data service 112 may also maintain information that identifies the image processing device 102, such as a device identifier.

In some embodiments, the counter data service 112 provides functionality for maintaining and accessing information stored in the data store 113. The counter data service 112 may perform various operations with respect to the data store 113. Examples of operations include adding entries to the data store 113; deleting entries from the data store 113; modifying entries in the data store 113; searching for entries in the data store 113; and retrieving entries from the data store 113. In some embodiments, the counter data service 112 provides functionality for managing counter data in the data store 113. For example, the counter data service 112 may perform one or more operations to add, delete, modify, search for, or retrieve one or more of the following in the data store 113: counter information associated with a component installed on the image processing device 102, information that identifies a component installed on the image processing device 102, information that identifies the image processing device 102, or other suitable information.

The information in the data store 113 may be organized in any suitable manner. For example, counter data in the data store 113 may be organized based on or in accordance with any suitable information. By way of example and not by way of limitation, the counter data may be organized according to: component type; the image processing device on which a component is installed; the organization/enterprise associated with the image processing device; counter information associated with a component; other suitable information; or a combination of two or more of these. The information in the data store 113 may be organized according to one or more settings of the counter data service 112, including default setting(s) or setting(s) based on one or more inputs indicating one or more user selections.

The counter data service 112 executing on the server computing system 104 may update counter data in the data store 113 periodically. In some embodiments, the counter data service 112 periodically sends, to an image processing device, a request for counter information associated with one or more components of the image processing device. The counter data service 112 executing on the server computing system 104 may request the counter information from the image processing device after a predetermined time period, in accordance with one or more settings of the counter data service 112. For example, a setting of the counter data service 112 may be to automatically request counter information from one or more image processing device(s) at a predetermined time each day. In some embodiments, the counter data service 112 executing on the server computing system 104 initiates a timer in connection with an event such as the sending of the request for updated counter information or other suitable event. The timer may expire after a predetermined time period. The counter data service 112 executing on the server computing system 104 may monitor for an expiration of the timer and, based on the expiration of the timer, may send the request for the counter information associated with image processing device components. Based on the counter information received from the image processing device in response to the request, the counter data service 112 then updates counter data in the data store 113. For example, the counter data service 112 may perform one or more operations for adding, deleting, modifying, searching for, or retrieving one or more entries in the data store 113 in accordance with the counter information received from the image processing device.

The network 105 couples one or more servers and one or more clients to each other. The network 105 may be any suitable network. For example, one or more portions of the network 105 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 105 may include one or more networks.

Figure 2:
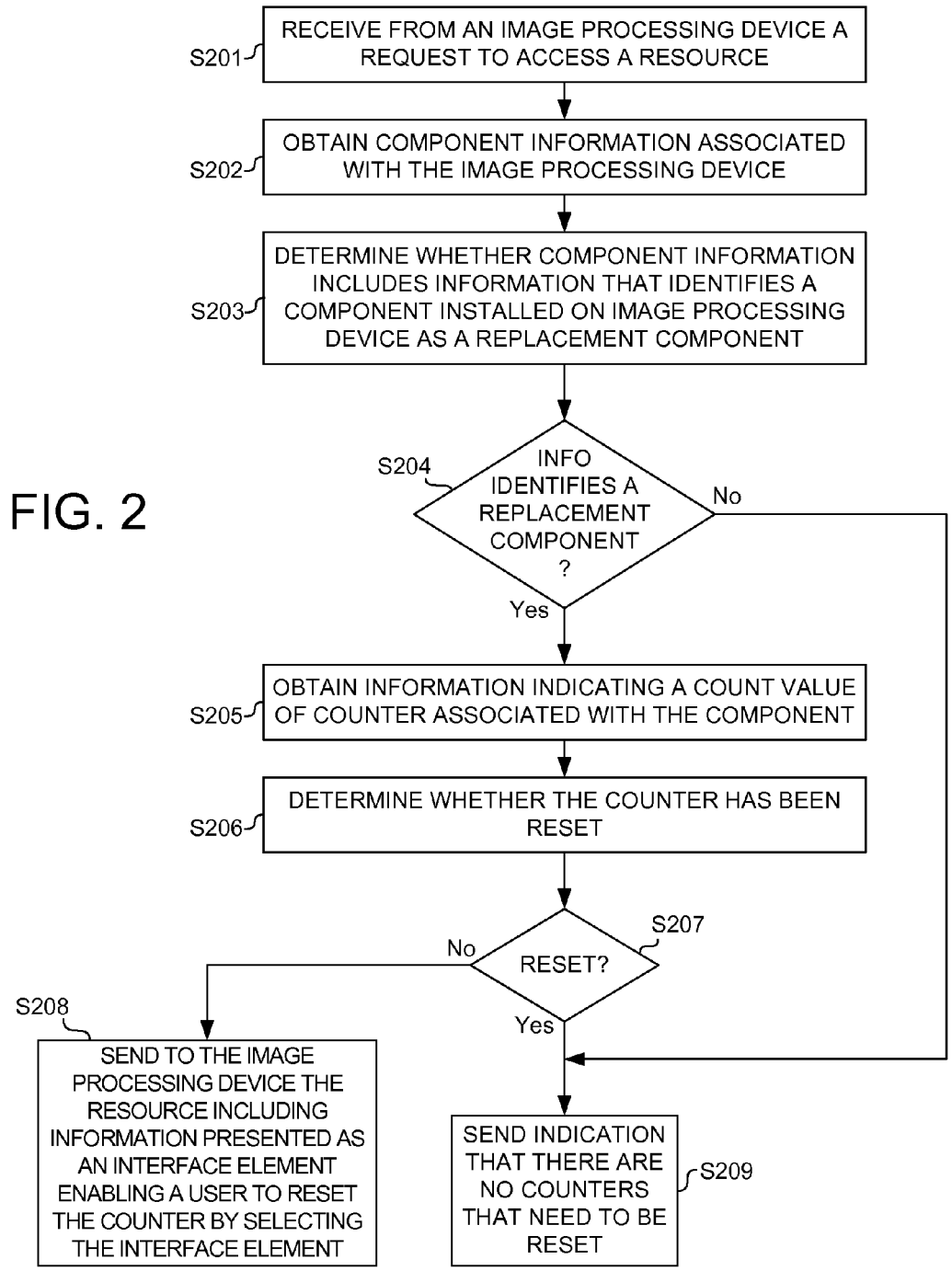
FIG. 2 illustrates an example flow of operations at a server computing system.

FIG. 2 is described with reference to the example network environment 100 of FIG. 1. FIG. 2 illustrates an example flow of operations at the server computing system 101. One or more of the steps of FIG. 2 may be performed based on or in accordance with default settings for the web-based application 106, a predetermined policy, one or more inputs indicating one or more user selections, or a combination of two or more of these.

In step S201, the server computing system 101 receives, from the image processing device 102, a request to access a resource. In some embodiments, the request received in step S201 comprises a request for the server computing system 101 to send the resource to the image processing device 102. All or a portion of the requested resource may be stored at the server computing system 101. In some embodiments, step S201 includes receiving information that identifies the image processing device 102. For example, the server computing system 101 may receive, from the image processing device 102, a device identifier that identifies the image processing device 102 and the request to access the resource. The information that identifies the image processing device 102 may be one or more of an IP address, a hostname, a MAC address, or other suitable information to identify, locate or communicate with the image processing device 102.

In some embodiments, the request to access the resource received in step S201 is a request sent to the server computing system 101 based on one or more user inputs received at the image processing device 102. For example, a user may provide one or more inputs via the user interface 109 of the image processing device 102. In some embodiments, information included in the request is based on one or more user inputs received via the user interface 109 of the image processing device 102. In some embodiments, the request is issued in response to one or more user inputs received via the user interface 109. The one or more inputs may be provided by the user via one or more hard keys and/or a display having a touch sensitive element operable to receive user inputs or commands based on the touching of interface elements presented in a graphical user interface (GUI) on the display. In some embodiments, the request to access the resource received in step S201 is based on one or more inputs received via one or more hard keys of the image processing device 102. For example, a user may press one or more hard keys in order to issue the request to access the resource. In some embodiments, the request to access the resource received in step S201 is based on one or more inputs received via a touch screen of the image processing device 102. For example, the user may touch one or more interface elements displayed on the touch sensitive display in order to issue the request to access the resource.

In some embodiments, step S201 comprises receiving, at the server computing system 101 from a browser on the image processing device 102, the request to access the resource. The resource requested in step S201 may be any suitable resource. In some embodiments, the resource requested in step S201 is a program. For example, the request to access the resource may comprise a request, from the browser on the image processing device 102, to access a program configured to run within a browser. In some embodiments, the resource requested in step S201 is a web page. For example, the request to access the resource may comprise a request, from the browser on the image processing device 102, to access a web page. The web page may be any suitable web page and one or more elements of the web page content may be stored at the server computing system 101.

In some embodiments, the request to access the resource received in step S201 is a request sent to the server computing system 101 based on one or more user inputs received via a browser of the image processing device 102. For example, a user may input a uniform resource identifier (URI), may click a hypertext link within a browser window, or may provide an input indicating selection of an interface element presented as a graphical object in the browser. The URI, the hypertext link, or the interface element may identify the resource requested in step S201. The resource may be a web page. The server computing system 101 may be used to host one or more resources, which may include the resource requested in step S201. The one or more resources may be part of the web-based application 106 running on the server computing system 101. A user at the image processing device 102 may provide one or more inputs via the browser of the image processing device 102 in order to issue a request to access the resource identified by, for example, the URI, the hypertext link, or the interface element. In some embodiments, the web-based application 106 executing on the server computing system 101 receives an HTTP request based on the input(s) received via the browser of the image processing device 102. In some embodiments, receiving the request in step S201 comprises receiving the HTTP request sent from the browser of the image processing device 102.

In some embodiments, the request to access the resource received in step S201 is a request sent to the server computing system 101 in response to the image processing device 102 switching from a first operation mode to a second operation mode, the second operation mode comprising an operation mode for performing component removal and component installation on the image processing device 102. The operation mode for performing component removal and component installation may be a service mode. By way of example, a service mode may be an operation mode used when maintenance work is performed on the image processing device 102. When the image processing device 102 is operating in a service mode, various features and/or operations may be available or permissible which may not be available or permissible in a different mode of operation. For example, in a service mode, features may be available for modifying settings of the image processing device 102, testing functionality of the image processing device 102, or checking the status of the image processing device 102 or a component of the image processing device 102. Moreover, in a service mode, one or more operations (for example, removal, installation, adjustment, repair, or cleaning of a component) may be performed with respect to one or more components of the image processing device 102.

In some embodiments, step S201 includes receiving, at the server computing system 101, a request the image processing device 102 sent in response to the image processing device 102 switching to the operation mode for performing component removal and component installation on the image processing device 102. The image processing device 102 may have switched to the operation mode for performing component removal and component installation on the image processing device 102 from a different operation mode. The different operation mode may be a standard or default operation mode for the image processing device 102, and may be a mode of operation for utilizing features of the image processing device 102 such as printing, copying, or scanning. The operation mode for performing component removal and component installation may be the service mode. In some embodiments, the image processing device 102 switches to the operation mode for performing component removal and component installation on the image processing device 102 from the different operation mode based on the occurrence of an event which triggers the switch to the operation mode for performing component removal and component installation on the image processing device 102.

By way of example, the image processing device 102 may be set to a mode of operation different from the service mode (for example, the standard or default operation mode) and then an event may occur which causes the image processing device 102 to switch to the service mode for maintenance work to be performed on the image processing device 102. Examples of events which may cause the image processing device 102 to switch to the service mode include but are not limited to the following: one or more user inputs for entering the service mode are provided; and a status of a component of the image processing device 102 is changed (for example, a panel of the image processing device 102 is opened). In some embodiments, in response to the image processing device 102 switching to the service mode, the image processing device 102 sends, to the server computing system 101, the request received in step S201. For example, the request to access the resource received in step S201 may be a request sent, from the image processing device 102 to the server computing system 101, in response to the image processing device 102 switching to the service mode.

In step S202, the server computing system 101 obtains component information associated with the image processing device 102. The component information associated with the image processing device 102 may be any suitable information for use in determining whether one or more components of the image processing device 102 is/are replacement components. In some embodiments, the web-based application 106 executing on the server computing system 101 updates the data store 107 based on the component information obtained in step S202. For example, the web-based application 106 may perform one or more operations for adding, deleting, modifying, searching for, or retrieving one or more entries in the data store 107 in accordance with the component information obtained in step S202.

In some embodiments, in step S202 the server computing system 101 obtains the component information associated with the image processing device 102 from the server computing system 103. Step S202 is described further with reference to FIG. 3.

Figure 3:
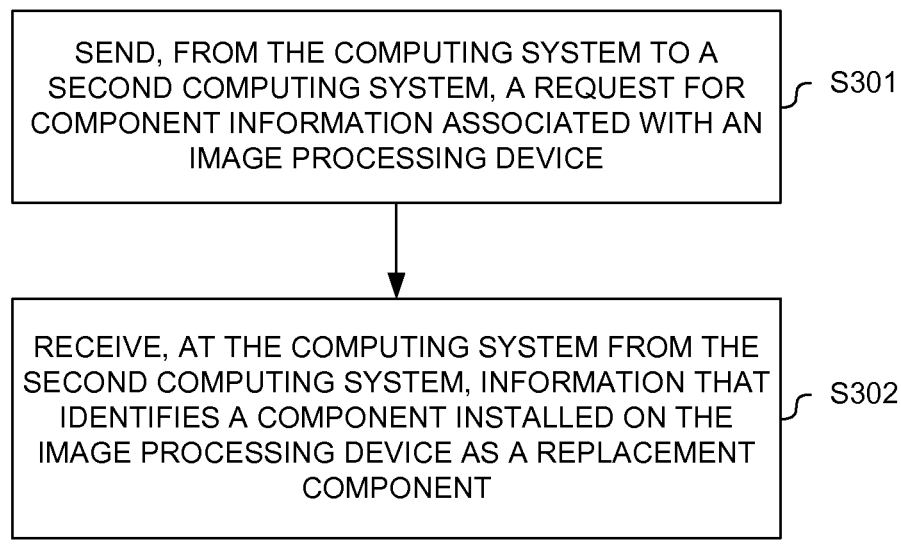
FIG. 3 illustrates an example flow of operations at a server computing system.

FIG. 3 is described with reference to the example network environment 100 of FIG. 1. FIG. 3 illustrates an example flow of operations at the server computing system 101. One or more of the steps of FIG. 3 may be performed based on or in accordance with default settings for the web-based application 106, a predetermined policy, one or more inputs indicating one or more user selections, or a combination of two or more of these. According to some embodiments, step S202 includes performing one or more of the operations of FIG. 3. For example, step S202 may include performing steps S301 and S302 of FIG. 3.

In step S301, the server computing system 101 sends, to the server computing system 103, a request for component information associated with the image processing device 102. In some embodiments, the server computing system 101 sends the request for component information in step S301 in response to receiving, in step S201, the request to access the resource. For example, step S301 may include sending, from the server computing system 101 to the server computing system 103, the request for component information associated with the image processing device 102 in response to receiving, at the server computing system 101 from the image processing device 102, the request to access the resource in step S201.

In some embodiments, step S301 includes sending information that identifies the image processing device 102. For example, the server computing system 101 may send, to the server computing system 103, a device identifier that identifies the image processing device 102 and the request for component information associated with the image processing device 102. The information that identifies the image processing device 102 may be information the server computing system 101 received from the image processing device 102 in step S201. For example, the information that identifies the image processing device 102 may be one or more of an IP address, a hostname, a MAC address, or other suitable information to identify, locate or communicate with the image processing device 102.

In some embodiments, the request sent in step S301 comprises a request for all of the component identification information associated with the image processing device 102. For example, in step S301, the server computing system 101 may send a request for the server computing system 103 to send, to the server computing system 101, the respective component identification information for each component installed on the image processing device 102. The server computing system 101 may send the request for all of the component identification information associated with the image processing device 102 together with the information that identifies the image processing device 102.

In some embodiments, the request sent in step S301 comprises a request for component identification information that identifies the component(s) installed on the image processing device 102 as replacement component(s). For example, in step S301, the server computing system 101 may send a request for the server computing system 103 to send, to the server computing system 101, only the respective component identification information for each replacement component installed on the image processing device 102. By way of example, the request sent in step S301 may be a request for only updated component information associated with the image processing device 102. The updated component information may be respective information corresponding to each component installed on the image processing device 102 since the server computing system 101 last requested the server computing system 103 send component information associated with the image processing device 102. The server computing system 101 may send the request for the updated component information associated with the image processing device 102 together with the information that identifies the image processing device 102.

In step S302, the server computing system 101 receives, from the server computing system 103, the component information requested in step S301. In some embodiments, step S302 includes receiving information that identifies a component installed on the image processing device 102 as a replacement component. The component information received in step S302 may be stored in the data store 107 on the server computing system 101. For example, the web-based application 106 executing on the server computing system 101 may perform one or more operations to update information in the data store 107 by, for example, adding and/or modifying entries in the data store 107 based on the component information received in step S302.

In some embodiments, the component information received in step S302 comprises inventory data associated with the image processing device 102 on the server computing system 103. For example, in step S302 the server computing system 101 may receive, from the server computing system 103, inventory data that the server computing system 103 retrieved from the data store 111. The inventory data in the data store 111 may include respective component identification information for each of one or more components installed on the image processing device 102.

In some embodiments, the component information received in step S302 comprises respective component identification information for each component installed on the image processing device 102. For example, in step S302 the server computing system 101 may receive, from the server computing system 103, the respective component identification information for each component installed on the image processing device 102 in response to a request for all of the component identification information associated with the image processing device 102 sent by the server computing system 101 in step S301.

In some embodiments, the component information received in step S302 comprises respective component identification information for each replacement component installed on the image processing device 102. For example, in step S302 the server computing system 101 may receive, from the server computing system 103, the respective component identification information for each replacement component installed on the image processing device 102 in response to a request for component identification information that identifies the component(s) installed on the image processing device 102 as replacement component(s) sent by the server computing system 101 in step S301. By way of example, the request sent in step S301 may have been a request for only updated component information associated with the image processing device 102. The respective component identification information for each replacement component installed on the image processing device 102 received in step S302 may be respective information corresponding to each component installed on the image processing device 102 since the server computing system 101 last requested the server computing system 103 send component information associated with the image processing device 102.

Referring again to step S202, in some embodiments, the server computing system 101 obtains component information associated with the image processing device 102 by accessing information in the data store 107. In some embodiments, the server computing system 101 receives information associated with the image processing device 102 prior to receiving the request in step S201, and the web-based application 106 executing on the server computing system 101 stores the information in the data store 107. The web-based application 106 executing on the server computing system 101 may periodically request and receive information associated with the image processing device 102, and update the data store 107 based on the information. In some embodiments, the web-based application 106 executing on the server computing system 101 periodically requests and receives component information associated with the image processing device 102 from the server computing system 103. For example, one or more operations described with reference to FIG. 3 may be performed periodically. Then the data store 107 may be updated based on the received component information. According to some embodiments, the server computing system 101 obtains the component information associated with the image processing device 102 in step S202 by accessing the data store 107 having been updated based on the received component information.

The server computing system 101 may periodically request and receive component information associated with the image processing device 102, and update the data store 107 based on the component information in any suitable manner. By way of example, the web-based application 106 executing on the server computing system 101 may request component information associated with the image processing device 102 after a predetermined time period, in accordance with one or more settings of the web-based application 106. For example, a setting of the web-based application 106 may be to automatically request component information from the server computing system 103 at a predetermined time each day. In some embodiments, the web-based application 106 executing on the server computing system 101 initiates a timer in connection with an event such as the sending of a request for component information or other suitable event. The timer may expire after a predetermined time period. The web-based application 106 executing on the server computing system 101 may monitor for an expiration of the timer and, based on the expiration of the timer, may send the request for the component information associated with the image processing device 102. Based on the component information received, the web-based application 106 may then update the data store 107. For example, the web-based application 106 may perform one or more operations for adding, deleting, modifying, searching for, or retrieving one or more entries in the data store 107 in accordance with the received component information.

In step S203, the server computing system 101 determines whether the component information obtained in step S202 includes information that identifies a component installed on the image processing device 102 as a replacement component. For example, the server computing system 101 may determine whether the component information obtained in step S202 includes information that identifies a component installed on the image processing device 102 since the server computing system 101 last obtained component information associated with the image processing device 102.

In some embodiments, the server computing system 101 determines, in step S203, whether the component information includes information that identifies a component installed on the image processing device 102 as a replacement component based on whether one or more components is/are identified in the information obtained in step S202. For example, the component information obtained in step S202 may comprise respective component identification information for each replacement component installed on the image processing device 102. By way of example, the component information obtained in step S202 may be information that was sent to the server computing system 101 in response to a request for only updated component information associated with the image processing device 102. The respective component identification information for each replacement component installed on the image processing device 102 obtained in step S202 may be respective information corresponding to each component installed on the image processing device 102 since the server computing system 101 last obtained component information associated with the image processing device 102. Accordingly, in some embodiments the server computing system 101 determines in step S203 that information obtained in step S202 identifies a replacement component based on the respective information that identifies one or more components installed on the image processing device 102 since the server computing system 101 last obtained component information associated with the image processing device 102. On the other hand, the server computing system 101 may determine in step S203 that information obtained in step S202 does not identify a replacement component. By way of example, information obtained in step S202 may be information that was sent to the server computing system 101 in response to a request for only updated component information associated with the image processing device 102, and the information obtained in step S202 may indicate that no new components were installed on the image processing device 102 since the server computing system 101 last obtained component information associated with the image processing device 102.

In some embodiments, the server computing system 101 determines, in step S203, whether the component information includes information that identifies a component installed on the image processing device 102 as a replacement component by comparing component information obtained in step S202 with information in the data store 107. For example, the component information obtained in step S202 may comprise respective component identification information for each component installed on the image processing device 102. Moreover, the data store 107 may contain previously obtained component information associated with the image processing device 102. The previously obtained component information in the data store 107 may include respective component identification information for each of one or more components currently or formerly installed on the image processing device 102. In some embodiments, in step S203, the server computing system 101 determines whether the component information obtained in step S202 identifies a replacement component by checking whether the respective component identification information obtained in step S202 includes new information relative to the information associated with the image processing device 102 in the data store 107. For example, the server computing system 101 may search the data store 107 and compare the respective component identification information obtained in step S202 to one or more entries in the data store 107 to determine whether the component information obtained in step S202 includes component identification information, such as a component identifier, for which there is not a matching entry in the data store 107. In some embodiments, the server computing system 101 determines in step S203 that component identification information obtained in step S202 identifies a replacement component based on there being no entry, in the data store 107, matching the component identification information. On the other hand, the server computing system 101 may determine in step S203 that the component information obtained in step S202 does not identify a replacement component. For example, the server computing system 101 may determine that the component information does not contain new information relative to the information associated with the image processing device 102 in the data store 107.

In step S204, in response to determining that the component information obtained in step S202 does not identify a replacement component (No in step S204), the process advances to step S209. On the other hand, in response to determining that the component information obtained in step S202 includes information that identifies a replacement component (Yes in step S204), the process advances to step S205.

In step S205, the server computing system 101 obtains counter information associated with the component installed on the image processing device 102 as a replacement component. In some embodiments, the counter information is information indicating a count value of a counter associated with the replacement component. In some embodiments, the web-based application 106 executing on the server computing system 101 updates the data store 107 based on the counter information obtained in step S205. For example, the web-based application 106 may perform one or more operations for adding, deleting, modifying, searching for, or retrieving one or more entries in the data store 107 in accordance with the counter information obtained in step S205.

In some embodiments, the server computing system 101 obtains the counter information in step S205 from the server computing system 104. Step S205 is described further with reference to FIG. 4.

Figure 4:
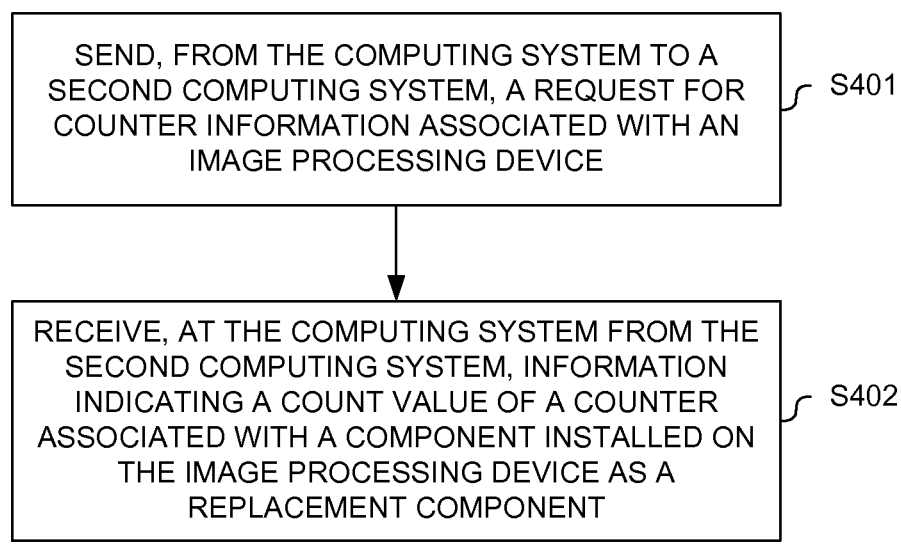
FIG. 4 illustrates an example flow of operations at a server computing system.

FIG. 4 is described with reference to the example network environment 100 of FIG. 1. FIG. 4 illustrates an example flow of operations at the server computing system 101. One or more of the steps of FIG. 4 may be performed based on or in accordance with default settings for the web-based application 106, a predetermined policy, one or more inputs indicating one or more user selections, or a combination of two or more of these. According to some embodiments, step S205 includes performing one or more of the operations of FIG. 4. For example, step S205 may include performing steps S401 and S402 of FIG. 4.

In step S401, the server computing system 101 sends, to the server computing system 104, a request for counter information associated with the image processing device 102. In some embodiments, the server computing system 101 sends the request for counter information in step S401 in response to determining that the component information obtained in step S202 includes information that identifies a replacement component.

In some embodiments, step S401 includes sending information that identifies the image processing device 102. For example, the server computing system 101 may send, to the server computing system 104, a device identifier that identifies the image processing device 102 and the request for counter information associated with the image processing device 102. The information that identifies the image processing device 102 may be information the server computing system 101 received from the image processing device 102 in step S201. For example, the information that identifies the image processing device 102 may be one or more of an IP address, a hostname, a MAC address, or other suitable information to identify, locate or communicate with the image processing device 102.

In some embodiments, the request sent in step S401 comprises a request for all of the counter information associated with the image processing device 102. For example, in step S401, the server computing system 101 may send a request for the server computing system 104 to send, to the server computing system 101, the respective counter information for each component installed on the image processing device 102. The server computing system 101 may send the request for all of the counter information associated with the image processing device 102 together with the information that identifies the image processing device 102.

In some embodiments, step S401 includes sending information that identifies a component installed on the image processing device 102. For example, the server computing system 101 may send, to the server computing system 104, component identification information (such as a component identifier) that identifies a component installed on the image processing device 102, and a request for counter information associated with the identified component. The information that identifies the component may be information the server computing system 101 obtained from the server computing system 103. In some embodiments, the component identification information sent in step S401 is the information described with reference to step S203, namely the information that identifies a component installed on the image processing device 102 as a replacement component.

In some embodiments, the request sent in step S401 comprises a request for counter information associated with the component(s) installed on the image processing device 102 as replacement component(s). For example, in step S401, the server computing system 101 may send respective component identification information identifying each of one or more replacement component(s) installed on the image processing device 102, and a request for the server computing system 104 to send, to the server computing system 101, only the respective counter information for each of the identified replacement component(s).

In step S402, the server computing system 101 receives, from the server computing system 104, the counter information requested in step S401. In some embodiments, step S402 includes receiving information indicating a count value of a counter associated with a component installed on the image processing device 102 as a replacement component. The counter information received in step S402 may be stored in the data store 107 on the server computing system 101. For example, the web-based application 106 executing on the server computing system 101 may perform one or more operations to update information in the data store 107 by, for example, adding and/or modifying entries in the data store 107 based on the counter information received in step S402.

In some embodiments, the counter information received in step S402 comprises counter data associated with the image processing device 102 on the server computing system 104. For example, in step S402 the server computing system 101 may receive, from the server computing system 104, counter data that the server computing system 104 retrieved from the data store 113. The counter data in the data store 113 may include respective counter information for each of one or more components installed on the image processing device 102.

In some embodiments, the counter information received in step S402 comprises respective counter information for each component installed on the image processing device 102. For example, in step S402 the server computing system 101 may receive, from the server computing system 104, the respective counter information for each component installed on the image processing device 102 in response to a request for all of the counter information associated with the image processing device 102 sent by the server computing system 101 in step S401.

In some embodiments, the counter information received in step S402 comprises counter information associated with a specified component installed on the image processing device 102. For example, in step S402 the server computing system 101 may receive, from the server computing system 104, the counter information associated with a specified component installed on the image processing device 102 in response to a request for the counter information associated with the specified component sent by the server computing system 101 in step S401. The component may be specified by component identification information (such as a component identifier) that identifies the component installed on the image processing device 102, the server computing system 101 having sent the component identification information together with the request in step S401.

In some embodiments, the counter information received in step S402 comprises respective counter information for each replacement component installed on the image processing device 102. By way of example, in step S401, the server computing system 101 may have sent respective component identification information identifying each of one or more replacement component(s) installed on the image processing device 102, and a request for the server computing system 104 to send, to the server computing system 101, only the respective counter information for each of the identified replacement component(s). Accordingly, in step S402, the server computing system 101 may receive, from the server computing system 104, the respective counter information for each identified replacement component in response to the request sent in step S401.

Referring again to step S205, in some embodiments, the server computing system 101 obtains the counter information by accessing information in the data store 107. In some embodiments, the server computing system 101 receives information associated with the image processing device 102 prior to receiving the request in step S201, and the web-based application 106 executing on the server computing system 101 stores the information in the data store 107. The web-based application 106 executing on the server computing system 101 may periodically request and receive information associated with the image processing device 102, and update the data store 107 based on the information. In some embodiments, the web-based application 106 executing on the server computing system 101 periodically requests and receives counter information associated with the image processing device 102 from the server computing system 104. For example, one or more operations described with reference to FIG. 4 may be performed periodically. Then the data store 107 may be updated based on the received counter information. According to some embodiments, the server computing system 101 obtains the counter information in step S205 by accessing the data store 107 having been updated based on the received counter information.

The server computing system 101 may periodically request and receive counter information associated with the image processing device 102, and update the data store 107 based on the counter information in any suitable manner. By way of example, the web-based application 106 executing on the server computing system 101 may request counter information associated with the image processing device 102 after a predetermined time period, in accordance with one or more settings of the web-based application 106. For example, a setting of the web-based application 106 may be to automatically request counter information from the server computing system 104 at a predetermined time each day. In some embodiments, the web-based application 106 executing on the server computing system 101 initiates a timer in connection with an event such as the sending of a request for counter information or other suitable event. The timer may expire after a predetermined time period. The web-based application 106 executing on the server computing system 101 may monitor for an expiration of the timer and, based on the expiration of the timer, may send the request for the counter information associated with the image processing device 102. Based on the counter information received, the web-based application 106 may then update the data store 107. For example, the web-based application 106 may perform one or more operations for adding, deleting, modifying, searching for, or retrieving one or more entries in the data store 107 in accordance with the received counter information.

In step S206, the server computing system 101 determines whether the counter associated with the counter information obtained in step S205 has been reset. The counter information obtained in step S205 may be information indicating a count value of a counter associated with a component installed on the image processing device 102 as a replacement component. In some embodiments, an area of memory on the image processing device 102 is used as the counter associated with the component installed on the image processing device 102 as the replacement component. The counter may store a single value representing the number of times the component associated with the counter has operated. The stored value may be incremented by one. For example, the value may be incremented by one when the component associated with the counter is operated. The stored value may be reset to zero. In some embodiments, step S206 includes determining whether the counter has been reset based on the information indicating a count value of the counter. For example, the server computing system 101 may determine whether a counter associated with a replacement component has been reset based on the information, obtained in step S205, indicating a count value of the counter associated with the replacement component.

In some embodiments, step S206 includes determining, based on the information indicating a count value of a counter, whether the indicated value of the counter is zero. For example, the server computing system 101 may determine that a counter has been reset when the information, obtained in step S205, indicates the value of the counter is zero; and the server computing system 101 may determine that a counter has not been reset when the information, obtained in step S205, indicates the value of the counter is a value other than zero.

In some embodiments, step S206 includes determining, based on the information indicating a count value of a counter, whether the indicated value of the counter is less than a value of an entry in the data store 107 representing the value of that counter. For example, the server computing system 101 may determine that a counter has been reset when the information, obtained in step S205, indicates the value of the counter is less than the value of the entry that represents a previous value of that counter in the data store 107; and the server computing system 101 may determine that a counter has not been reset when the information, obtained in step S205, indicates the value of the counter is greater than or equal to the value of the entry that represents a previous value of that counter in the data store 107.

In some embodiments, step S206 includes determining, based on the information indicating a count value of a counter, whether the indicated value of the counter is less than a predetermined threshold value. For example, the server computing system 101 may determine that a counter has been reset when the information, obtained in step S205, indicates the value of the counter is less than the predetermined threshold value; and the server computing system 101 may determine that a counter has not been reset when the information, obtained in step S205, indicates the value of the counter is greater than or equal to the predetermined threshold value.

In some embodiments, multiple replacement components are installed on the image processing device 102, and the counter information obtained in step S205 comprises respective counter information for each of the replacement components installed on the image processing device 102. For each replacement component, the corresponding counter information may include information indicating a count value of a counter associated with that replacement component. Accordingly, in some embodiments, in step S206 the server computing system 101 determines, for a plurality of counters, whether each respective counter has been reset based on the counter information obtained in step S205.

In step S207, in response to determining that the counter has been reset (Yes in step S207), the process advances to step S209. In some embodiments, in step S206 the server computing system 101 determines, for each one of multiple counters, whether each respective counter has been reset. In some embodiments, in step S207, in response to determining that all of the multiple counters have been reset (Yes in step S207), the process advances to step S209.

On the other hand, in response to determining that the counter has not been reset (No in step S207), the process advances to step S208. In some embodiments, in step S206 the server computing system 101 determines, for each one of multiple counters, whether each respective counter has been reset. In some embodiments, in step S207, in response to determining that at least one of the multiple counters has not been reset (No in step S207), the process advances to step S208.

In step S208, the server computing system 101 sends, to the image processing device 102, a resource including information for presentation as an interface element in a GUI on a display of the image processing device 102, the interface element enabling a user to reset the counter by selecting the interface element. The resource sent in step S208 may be any suitable resource. In some embodiments, the resource sent in step S208 is the resource described with reference to step S201, namely, the resource for which a request to access was received in step S201. For example, the resource sent in step S208 may be a web page, a program, or other suitable resource that includes information for presentation as the interface element enabling a user to reset the counter by selecting the interface element. In some embodiments, the counter which may be reset by selecting the interface element is a counter determined, in step S206, not to have been reset.

The resource sent in step S208 may be a resource that, when processed and/or displayed at the image processing device 102, provides one or more interface elements in a GUI on the display of the image processing device 102, at least one of the one or more interface elements enabling a user to reset the counter by selecting the interface element. Step S208 is described further with reference to FIG. 5 and FIG. 6, each of which illustrates an example GUI that may be presented on the display of the image processing device 102, in accordance with various embodiments. While particular examples of a GUI are illustrated, it will be understood that various other implementations of a GUI are within the scope of the present invention. For example, various features of the illustrated examples could be modified, rearranged, or removed, or one or more features could be added without departing from the scope of the invention.

Figure 5:
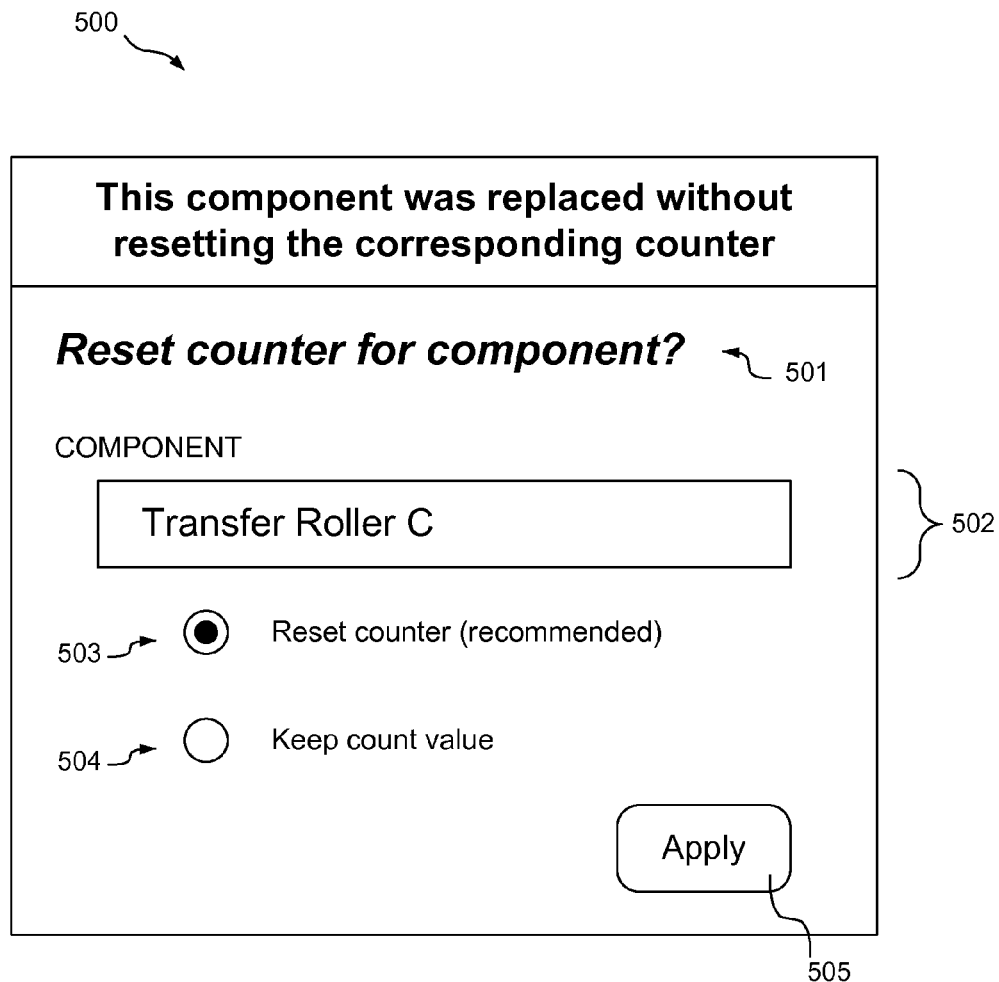
FIG. 5 illustrates an example graphical user interface on a display of an image processing device.

FIG. 5 illustrates an example GUI 500 on the display of the image processing device 102. The example GUI 500 includes interface elements enabling a user to reset a counter associated with a transfer roller. In some embodiments, the resource sent in step S208 is received and processed at the image processing device 102 and the application 108 executing on the image processing device 102 presents the example GUI 500 on the display of the image processing device 102. By way of example, a transfer roller may have been installed on the image processing device 102 as a replacement component and the counter associated with the transfer roller may not have been reset. In response to determining in step S206 that the counter associated with the transfer roller has not been reset, the server computing system 101 sends the resource requested in step S201 to the image processing device 102 in step S208. When the resource is processed and/or displayed at the image processing device 102, the example GUI 500 is then presented on the display of the image processing device 102.

The example GUI 500 includes a message 501, component information 502, a Reset Counter radio button 503, a Keep Count Value radio button 504, and an Apply button 505. The message 501 is textual information to prompt a user to provide user inputs. The text of the message 501 ("Reset counter for component?") is a query about whether the counter associated with the component identified in the component information 502 should be reset. The component information 502 includes textual information that identifies a component ("Transfer Roller C") of the image processing device 102. The Reset Counter radio button 503 is an interface element enabling a user to reset the counter for the Transfer Roller C by selecting the Reset Counter radio button 503 and then the Apply button 505. The Keep Count Value radio button 504 is an interface element enabling a user to maintain a count value associated with the counter for the Transfer Roller C by selecting the Keep Count Value radio button 504 and then the Apply button 505. Only one of the Reset Counter radio button 503 and the Keep Count Value radio button 504 may be selected at a time. In some embodiments, the Apply button 505 is presented as disabled until a selection of the Reset Counter radio button 503 or the Keep Count Value radio button 504 is made. The Apply button 505 is an interface element enabling a user to trigger processing corresponding to the selected radio button by selecting the Apply button 505.

The image processing device 102 may receive a user input to the Reset Counter radio button 503, the Keep Count Value radio button 504, or the Apply button 505 presented in the example GUI 500. For example, in order to reset the counter for the Transfer Roller C, a user may select the Reset Counter radio button 503 and the Apply button 505 by providing user inputs to the Reset Counter radio button 503 and then the Apply button 505. When the Reset Counter radio button 503 is selected, the image processing device 102 presents a dot or other indicator that designates the Reset Counter radio button 503 as a selected interface element, as shown in FIG. 5. In some embodiments, when the Reset Counter radio button 503 is selected, the Apply button 505 is enabled. A user may then select the Apply button 505 by providing a user input to the Apply button 505. In response to receiving the user input to the Apply button 505, the image processing device 102 may reset the counter associated with the Transfer Roller C. On the other hand, if the Keep Count Value radio button 504 is selected, the image processing device 102 presents a dot or other indicator that designates the Keep Count Value radio button 504 as the selected interface element. In some embodiments, when the Keep Count Value radio button 504 is selected, the Apply button 505 is enabled. A user may then select the Apply button 505 by providing a user input to the Apply button 505. In response to receiving the user input to the Apply button 505, the image processing device 102 may close the window shown in FIG. 5 or exit the application 108 without resetting the counter associated with the Transfer Roller C.

Figure 6:
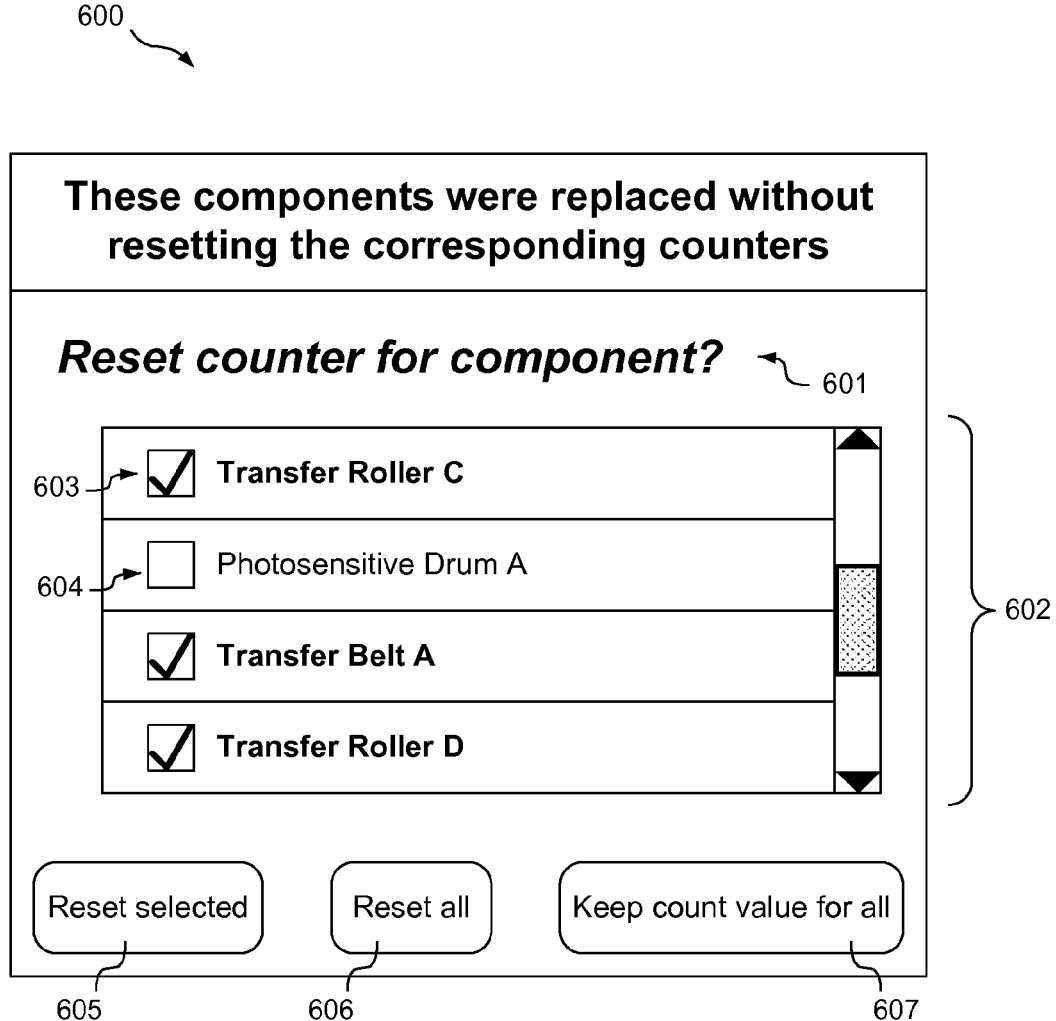
FIG. 6 illustrates an example graphical user interface on a display of an image processing device.

FIG. 6 illustrates an example GUI 600 on the display of the image processing device 102. The example GUI 600 includes interface elements enabling a user to reset counters associated with various components. In some embodiments, the resource sent in step S208 is received and processed at the image processing device 102 and the application 108 executing on the image processing device 102 presents the example GUI 600 on the display of the image processing device 102. By way of example, at least two transfer rollers, a photosensitive drum, and a transfer belt may have been installed on the image processing device 102 as replacement components and the respective counters associated with those components may not have been reset. In response to determining in step S206 that the counters associated with those components have not been reset, the server computing system 101 sends the resource requested in step S201 to the image processing device 102 in step S208. When the resource is processed and/or displayed at the image processing device 102, the example GUI 600 is then presented on the display of the image processing device 102.

The example GUI 600 includes a message 601, a list of components 602, checkboxes each associated with a respective component, the checkboxes including a selected checkbox 603 and an unselected checkbox 604, a Reset Selected button 605, a Reset All button 606, and a Keep Count Value For All button 607. The message 601 is textual information to prompt a user to provide user inputs. The text of the message 601 ("Reset counter for component?") is a query about whether counters associated with the identified components in the list of components 602 should be reset. The list of components 602 includes respective textual information that identifies each component ("Transfer Roller C" and "Photosensitive Drum A" and "Transfer Belt A" and "Transfer Roller D") in list of components 602. Each checkbox is an interface element associated with a respective component. By selecting the checkbox associated with a component, a user may designate the component corresponding to the selected checkbox as a selected component. For example, in response to user inputs indicating selection of the checkboxes associated with Transfer Roller C, Transfer Belt A, and Transfer Roller D, the image processing device 102 may present the selected checkbox 603 for each selected component, as shown in FIG. 6. Moreover, the unselected checkbox 604 may be presented for the Photosensitive Drum A, as shown in FIG. 6, because no user input indicating selection of the checkbox associated with the Photosensitive Drum A has been received. The Reset Selected button 605 is an interface element enabling a user to reset each respective counter for the selected components by selecting the Reset Selected button 605. The Reset All button 606 is an interface element enabling a user to reset each respective counter for the Transfer Roller C, Photosensitive Drum A, Transfer Belt A, and Transfer Roller D by selecting the Reset All button 606, regardless of the status of the respective checkbox associated with each component. The Keep Count Value For All button 607 is an interface element enabling a user to maintain a count value associated with the counter for the Transfer Roller C, Photosensitive Drum A, Transfer Belt A, and Transfer Roller D by selecting the Keep Count Value For All button 607, regardless of the status of the respective checkbox associated with each component.

The image processing device 102 may receive one or more inputs to one or more of the interface elements presented in the example GUI 500. For example, in order to reset each respective counter for the Transfer Roller C, Transfer Belt A, and Transfer Roller D, without resetting the counter for the Photosensitive Drum A, a user may provide inputs indicating selection of the checkboxes associated with Transfer Roller C, Transfer Belt A, and Transfer Roller D. In response to the inputs, the image processing device 102 may present a selected checkbox 603 having a checkmark or other indicator for each respective checkbox associated with the Transfer Roller C, Transfer Belt A, and Transfer Roller D, as shown in FIG. 6, to designate the Transfer Roller C, Transfer Belt A, and Transfer Roller D as selected components. In response to selection of the Reset Selected button 605 while the Transfer Roller C, Transfer Belt A, and Transfer Roller D are designated as selected components, the image processing device 102 may reset each respective counter for the Transfer Roller C, the Transfer Belt A, and the Transfer Roller D, without resetting the counter for the Photosensitive Drum A.

Further by way of example, in order to reset each respective counter for the Transfer Roller C, Photosensitive Drum A, Transfer Belt A, and Transfer Roller D, a user may provide an input indicating selection of the Reset All button 606. In response to selection of the Reset All button 606, the image processing device 102 may reset each respective counter for the Transfer Roller C, the Photosensitive Drum A, the Transfer Belt A, and the Transfer Roller D, regardless of the status of the respective checkbox associated with each component.

Further by way of example, in order to maintain each count value associated with the respective counters for the Transfer Roller C, Photosensitive Drum A, Transfer Belt A, and Transfer Roller D, a user may provide an input indicating selection of the Keep Count Value For All button 607. In response to selection of the Keep Count Value For All button 607, the image processing device 102 may maintain a count value associated with the counter for the Transfer Roller C, Photosensitive Drum A, Transfer Belt A, and Transfer Roller D, regardless of the status of the respective checkbox associated with each component. For example, the image processing device 102 may close the window shown in FIG. 6 or exit the application 108 without resetting the respective counters associated with the Transfer Roller C, Photosensitive Drum A, Transfer Belt A, and Transfer Roller D.

Referring again to FIG. 2, as described with reference to step S204, in response to determining that the component information obtained in step S202 does not identify a replacement component (No in step S204), the process advances to step S209. Moreover, as described with reference to step S207, in response to determining that the counter has been reset (Yes in step S207), the process advances to step S209. In some embodiments, in step S206 the server computing system 101 determines, for each one of multiple counters, whether each respective counter has been reset. In some embodiments, in step S207, in response to determining that all of the multiple counters have been reset (Yes in step S207), the process advances to step S209.

In step S209, the server computing system 101 sends, to the image processing device 102, information indicating that there are no counters that need to be reset. In some embodiments, step S209 includes sending a web page, or other suitable resource, that includes information indicating that there are no counters that need to be reset. In some embodiments, the information sent in step S209 is received and processed at the image processing device 102 and the application 108 executing on the image processing device 102 presents information on the display of the image processing device 102. For example, textual information may be presented on the display of the image processing device 102 to notify a user that no counters need to be reset.

Figure 7:
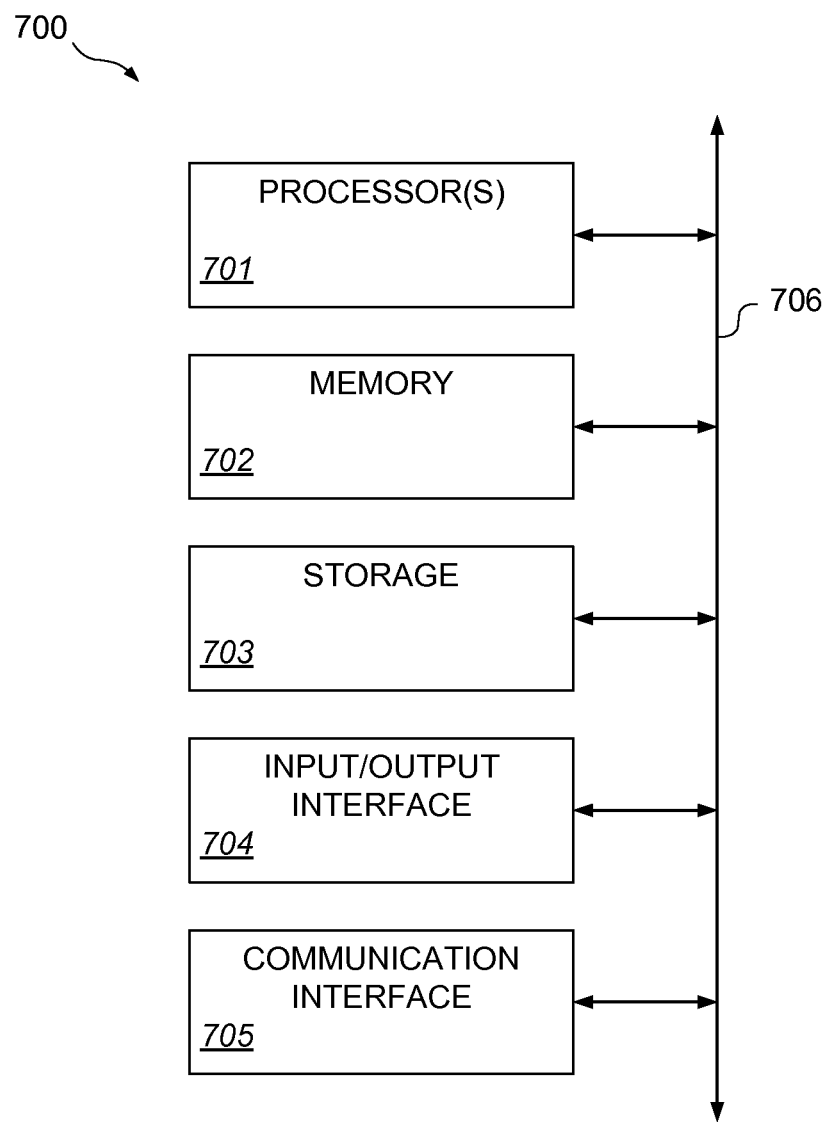
FIG. 7 illustrates an example computing system.

FIG. 7 illustrates an example computing system 700. According to various embodiments, all or a portion of the description of the computing system 700 is applicable to all or a portion of one or more of the server computing system 101, the image processing device 102, the server computing system 103, and the server computing system 103. In some embodiments, the server computing system 101 of FIG. 1 comprises the computing system 700. In some embodiments, the computing system 700 provides functionality described herein. In some embodiments, software running on the computing system 700 performs one or more operations described herein.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein includes but is not limited to an object that can be processed at a computing system. A resource can be a portion of executable instructions or data.

In some embodiments, the computing system 700 performs one or more steps of one or more methods described or illustrated herein. In some embodiments, the computing system 700 provides functionality described or illustrated herein. In some embodiments, software running on the computing system 700 performs one or more steps of one or more methods described or illustrated herein or provides functionality described or illustrated herein. Some embodiments include one or more portions of the computing system 700.

The computing system 700 includes one or more processor(s) 701, memory 702, storage 703, an input/output (I/O) interface 704, a communication interface 705, and a bus 706. The computing system 700 may take any suitable physical form. For example, and not by way of limitation, the computing system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a server, a tablet computer system, or a combination of two or more of these.

The processor(s) 701 include hardware for executing instructions, such as those making up a computer program. The processor(s) 701 may retrieve the instructions from the memory 702, the storage 703, an internal register, or an internal cache. The processor(s) 701 then decode and execute the instructions. Then, the processor(s) 701 write one or more results to the memory 702, the storage 703, the internal register, or the internal cache. The processor(s) 701 may provide the processing capability to execute the operating system, programs, user and application interfaces, and any other functions of the computing system 700.

The processor(s) 701 may include a central processing unit (CPU), one or more general-purpose microprocessor(s), application-specific microprocessor(s), and/or special purpose microprocessor(s), or some combination of such processing components. The processor(s) 701 may include one or more graphics processors, video processors, audio processors and/or related chip sets.

In some embodiments, the memory 702 includes main memory for storing instructions for the processor(s) 701 to execute or data for the processor(s) 701 to operate on. By way of example, the computing system 700 may load instructions from the storage 703 or another source to the memory 702. During or after execution of the instructions, the processor(s) 701 may write one or more results (which may be intermediate or final results) to the memory 702. One or more memory buses (which may each include an address bus and a data bus) may couple the processor(s) 701 to the memory 702. One or more memory management units (MMUs) may reside between the processor(s) 701 and the memory 702 and facilitate accesses to the memory 702 requested by the processor(s) 701. The memory 702 may include one or more memories. The memory 702 may be random access memory (RAM).

The storage 703 stores data and/or instructions. As an example and not by way of limitation, the storage 703 may include a hard disk drive, a floppy disk drive, flash memory, an optical disc, a magneto-optical disc, magnetic tape, or a Universal Serial Bus (USB) drive or a combination of two or more of these. In some embodiments, the storage 703 is a removable medium. In some embodiments, the storage 703 is a fixed medium. In some embodiments, the storage 703 is internal to the computing system 700. In some embodiments, the storage 703 is external to the computing system 700. In some embodiments, the storage 703 is non-volatile, solid-state memory. In some embodiments, the storage 703 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 703 may include one or more memory devices. One or more program modules stored in the storage 703 may be configured to cause various operations and processes described herein to be executed. The storage 703 may store application data, program modules and other information. One or more program modules stored in the storage 703 are configured to cause various operations and processes described herein to be executed. In some embodiments, the web-based application 106 resides on the storage 703 and executes on the computing system 700.

The I/O interface 704 includes hardware, software, or both providing one or more interfaces for communication between the computing system 700 and one or more I/O devices. The computing system 700 may include one or more of these I/O devices, where appropriate. One or more of these I/O devices may enable communication between a person and the computing system 700. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 704 includes one or more device or software drivers enabling the processor(s) 701 to drive one or more of these I/O devices. The I/O interface 704 may include one or more I/O interfaces.

The communication interface 705 includes hardware, software, or both providing one or more interfaces for communication (such as, for example, packet-based communication) between the computing system 700 and one or more other computing systems or one or more networks. As an example and not by way of limitation, the communication interface 705 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 705 for it. As an example and not by way of limitation, the computing system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 700 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The computing system 700 may include any suitable communication interface 705 for any of these networks, where appropriate. The communication interface 705 may include one or more communication interfaces 705.

The bus 706 interconnects various components of the computing system 700 thereby enabling the transmission of data and execution of various processes. The bus 706 may include one or more types of bus structures including a memory bus or memory controller, a peripheral bus, and a local bus using any of a variety of bus architectures.

Figure 8:
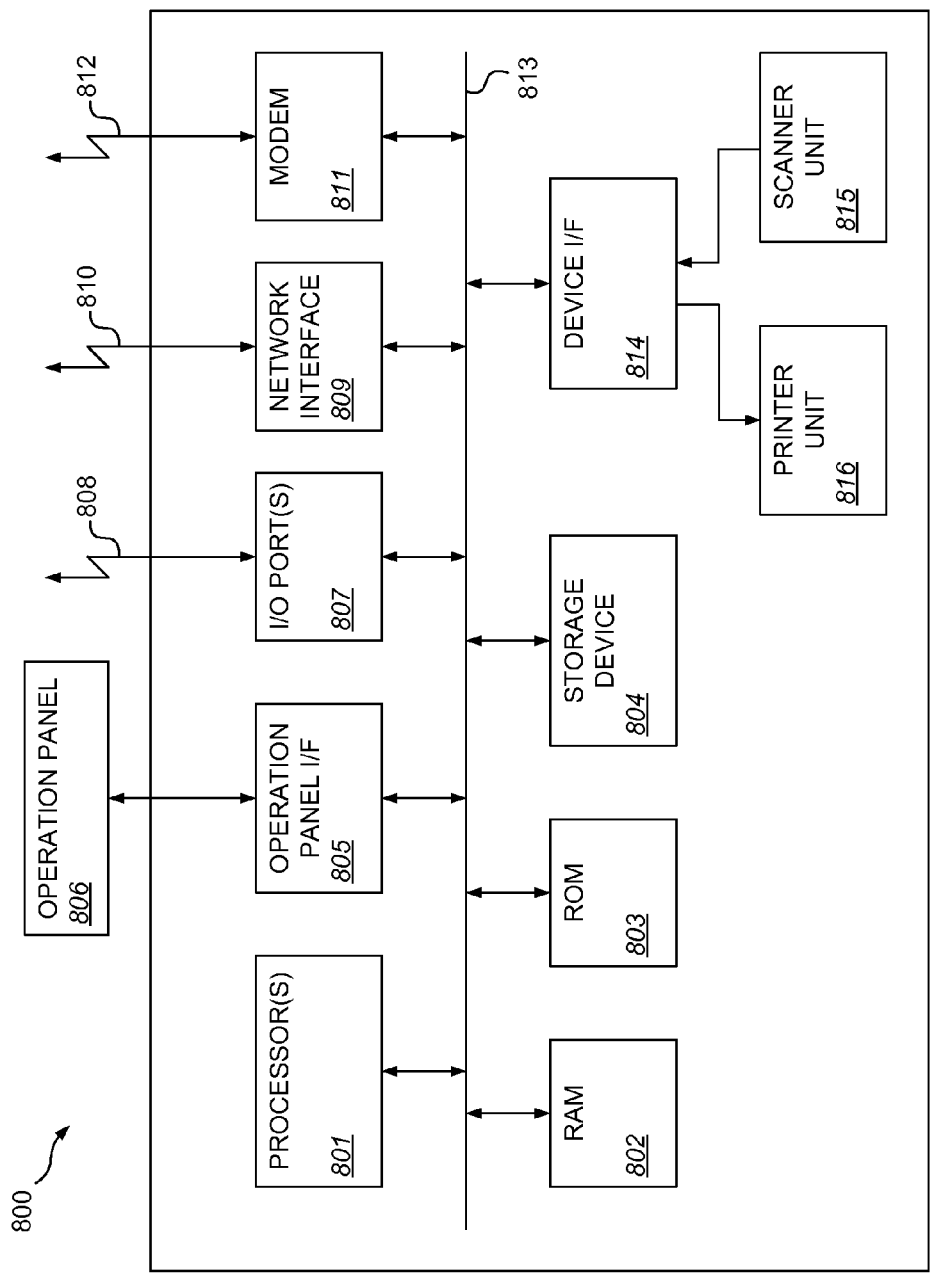
FIG. 8 illustrates an example image processing device.

FIG. 8 illustrates an example image processing device 800. In some embodiments, the image processing device 102 of FIG. 1 comprises the image processing device 800. The image processing device 800 of FIG. 8 is a multifunction peripheral having printing, scanning, copying, and other functions. However, it will be understood that various other implementations of an image processing device are within the scope of the present invention. For example, various components, modules, functions, and/or configurations of the image processing device 800 of FIG. 8 could be combined, deleted, or modified to form further implementations. Moreover, in some embodiments, another device (for example, a printer, a scanner, a fax machine, or other suitable device) or a computing system (for example, a computer connected to a printer and/or a scanner) may be implemented as the image processing device 800.

In some embodiments, the image processing device 800 performs one or more operations described herein. In some embodiments, the image processing device 800 provides functionality described herein. In some embodiments, software running on the image processing device 800 performs one or more operations described herein.

The image processing device 800 includes one or more processor(s) 801. The processor(s) 801 include a central processing unit (CPU) that performs overall control functions for the image processing device 800. The CPU uses a random access memory (RAM) 802 as a work area while executing instructions. The CPU executes instructions of various programs stored in one or more memory devices. For example, the CPU executes programs stored in a read only memory (ROM) 803 and in a storage device 804.

In some embodiments, the processor(s) 801 include one or more processors in addition to the CPU. By way of example, the processor(s) 801 may include one or more general-purpose microprocessor(s), application-specific microprocessor(s), and/or special purpose microprocessor(s). Additionally, in some embodiments the processor(s) 801 may include one or more internal caches for data or instructions.

The processor(s) 801 provide the processing capability required to execute an operating system, application programs, and various other functions provided on the image processing device 800. The processor(s) 801 perform or cause components of the image processing device 800 to perform various operations and processes described herein, in accordance with instructions stored in one or more memory devices.

The RAM 802 is used as a work area when the processor(s) 801 execute various instructions, such as those making up computer programs stored in the ROM 803 and/or the storage device 804. The RAM 802 may be used as a temporary storage area for various data, including input image data. The RAM 802 may be used as a cache memory. In some embodiments, the RAM may be dynamic RAM (DRAM) or static RAM (SRAM).

The ROM 803 stores data and programs having computer-executable instructions for execution by the processor(s) 801. In some embodiments, the ROM 803 is a boot ROM, storing instructions for the booting process. In some embodiments, the ROM 803 may be flash memory.

The storage device 804 stores application data, program modules and other information. One or more program modules stored in the storage device 804 are configured to cause various operations and processes described herein to be executed. In some embodiments, the application 108 resides on the storage device 804 and executes on the image processing device 800.

The storage device 804 also stores other programs and data to be processed. For example, the storage device 804 stores an operating system including programs and data for managing hardware and software components of the image processing device 800. Applications on the image processing device 800 may utilize the operating system to perform various operations. The storage device 804 may further store other programs and/or drivers that enable various functions of the image processing device 800, graphical user interface (GUI) functions, and/or processor functions. The storage device 804 may also store data files including, for example, image data, user data, configuration information, GUI components, such as graphical elements or templates, or other data required by the image processing device 800.

The image processing device 800 may store counter information. In some embodiments, the storage device 804 stores counter information. For example, an area of memory in the storage device 804 may be used as a counter associated with a particular component of the image processing device 800. In some embodiments, the counter stores a single value representing the number of times the component associated with the counter has operated. The stored value may be incremented by one. For example, the value may be incremented by one when the particular component associated with the counter is operated. The stored value may be reset to zero. For example, the value may be reset to zero when the component associated with the counter is replaced by a new component. In some embodiments, multiple counters are provided, each counter associated with a respective particular component of the image processing device 800.

By way of example and not by way of limitation, the storage device 804 may include a hard disk drive. In some embodiments, the image processing device 800 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 800. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 805 provides output signals to and receives input signals from an operation panel 806. Regarding the output signals, the operation panel interface 805 provides GUI data to the operation panel 806 for display on a liquid crystal display (LCD). Regarding the input signals, the operation panel interface 805 receives input signals based on user input operations at the operation panel 806 and relays the input signals to the processor(s) 801. In some embodiments, the operation panel 806 includes a touch sensitive element operable to receive user input operations or commands based on the touching of graphical objects displayed on the LCD. In some embodiments, the operation panel 806 includes a hard key panel.

The image processing device 800 includes one or more input/output (I/O) port(s) 807. The I/O port(s) 807 may include any suitable interface type such as a universal serial bus (USB) port, FireWire port (IEEE-1394), serial port, parallel port, or AC/DC power connection port. The I/O port(s) 807 enable one or more external device(s) 808 to communicate with the image processing device 800 when the external device(s) 808 is/are connected to the I/O port(s) 807. Examples of external devices 808 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 809 includes hardware, software, or both providing one or more interfaces for communication (such as, for example, packet-based communication) between the image processing device 800 and one or more other computing systems or one or more networks 810. As an example and not by way of limitation, the network interface 809 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 810 and any suitable network interface 809 for it. As an example and not by way of limitation, the image processing device 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 810 may be wired or wireless. As an example, the image processing device 800 may communicate with a wireless PAN (WPAN) (such as, for example, a BLUETOOTH WPAN), a WI-FI network, a WI-MAX network, or other suitable wireless network or a combination of two or more of these. The image processing device 800 may include any suitable network interface 809 for any of these networks 810, where appropriate.

A modem 811 modulates/demodulates image data and control signals. The modem 811 is connected to the Public Switched Telephone Network (PSTN) 812 and performs input/output of information between the image processing device 800 and the PSTN 812. By way of example, the modem 811 may send/receive facsimile communications.

A system bus 813 interconnects various components of the image processing device 800 thereby enabling the transmission of data and execution of various processes. The system bus 813 may include one or more types of bus structures including a memory bus or memory controller, a peripheral bus, and a local bus using any of a variety of bus architectures.

The device interface 814 is connected to the scanner unit 815 and to the printer unit 816. The device interface 814 performs synchronous/asynchronous conversion of image data.

The scanner unit 815 includes a light source and an image sensor. The scanner unit 815 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 815 includes an optical system (for example, mirrors, lens) that directs the light to the image sensor. After the image sensor generates the electrical signals, an analog-to-digital converter converts the electrical signals to digital image data representing the scanned physical document. The scanner unit 815 then outputs the digital image data to one or more other components of the image processing device 800 via the device interface 814.

In some embodiments, the scanner unit 815 includes one or more sensors to detect component removal and/or component installation. The scanner unit 815 includes various components for providing the functionality of the scanner unit 815. For example, the scanner unit 815 may include one or more motors, gears, transfer belts, transfer rollers, or other components that operate during a scan operation. During maintenance, one or more of the components of the scanner unit 815 may be detached from and/or attached to the image processing device 800. For example, a component may be removed for repair and/or cleaning and then reinstalled on the image processing device 800. Further by way of example, a component may be removed and then a replacement component installed on the image processing device 800. In some embodiments, sensors associated with the respective components of the scanner unit 815 are provided to detect the component removal and/or the component installation. The one or more sensors may include one or more optical sensors, one or more mechanical sensors, one or more electrical sensors, or a combination of two or more of these. The one or more sensors may be coupled to the processor(s) 801 and send output signals to the processor(s) 801.

The printer unit 816 is an image output device for printing on a sheet an image corresponding to image data. In response to a print command received at the image processing device 800, the printer unit 816 receives image data via the device interface 814 and outputs to a sheet an image corresponding to the image data.

In some embodiments, the printer unit 816 includes one or more sensors to detect component removal and/or component installation. The printer unit 816 includes various components for providing the functionality of the printer unit 816. For example, the printer unit 816 may include one or more photosensitive drums, transfer belts, transfer rollers, motors, gears, or other components that operate during a print operation. During maintenance, one or more of the components of the printer unit 816 may be detached from and/or attached to the image processing device 800. For example, a component may be removed for repair and/or cleaning and then reinstalled on the image processing device 800. Further by way of example, a component may be removed and then a replacement component installed on the image processing device 800. In some embodiments, sensors associated with the respective components of the printer unit 816 are provided to detect the component removal and/or the component installation. The one or more sensors may include one or more optical sensors, one or more mechanical sensors, one or more electrical sensors, or a combination of two or more of these. The one or more sensors may be coupled to the processor(s) 801 and send output signals to the processor(s) 801.

The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the examples given above may also exist without departing from the scope of the invention. While particular examples of GUIs are illustrated, it will be understood that various other implementations of GUIs are within the scope of the present invention. For example, various features of the illustrated examples could be modified, rearranged, or removed, or one or more features could be added without departing from the scope of the invention.

The scope of the present invention includes a computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

What is claimed is:

1. A method comprising:
   receiving, at a first server from an image processing device, a request to access a resource, the request comprising a request for the first server to send the resource to the image processing device;
   obtaining, at the first server from a second server, information that identifies a component installed on the image processing device as a replacement component, the second server separate from the image processing device;
   obtaining, at the first server from a third server, information indicating a count value of a counter associated with the component, the third server separate from the image processing device;
   determining, at the first server, that the counter has not been reset based on the count value of the counter being at least a predetermined value; and
   in response to determining that the counter has not been reset, sending, from the first server to the image processing device based on the request, the resource including information for presentation as an interface element in a graphical user interface on a display of the image processing device, the interface element enabling a user to reset the counter by selecting the interface element.

2. The method of claim 1, wherein the request to access the resource is a request sent to the first server based on one or more user inputs received at the image processing device.

3. The method of claim 1, wherein the request to access the resource is a request sent to the first server in response to the image processing device switching from a first operation mode to a second operation mode, the second operation mode comprising an operation mode for performing component removal and component installation on the image processing device.

4. The method of claim 1, wherein receiving the request to access the resource comprises receiving the request from a browser on the image processing device.

5. The method of claim 1, wherein obtaining the information that identifies the component comprises:
   sending, from the first server to the second server, a request for component information associated with the image processing device; and
   receiving, at the first server from the second server, the information that identifies the component.

6. The method of claim 5, wherein the sending the request for component information associated with the image processing device is performed in response to the receiving, at the first server from the image processing device, the request to access the resource.

7. The method of claim 5, wherein the information that identifies the component comprises inventory data associated with the image processing device.

8. The method of claim 1, wherein obtaining the information indicating the count value of the counter associated with the component comprises:
   sending, from the first server to the third server, a request for counter information associated with the image processing device; and
   receiving, at the first server from the third server, the information indicating the count value of the counter associated with the component.

9. The method of claim 8, wherein the sending the request for counter information associated with the image processing device includes sending, from the first server to the third server, the information that identifies the component.

10. A non-transitory computer-readable medium storing instructions that, when executed by one or more processors, cause the one or more processors to perform operations comprising:
    receiving, at a first server from an image processing device, a request to access a resource, the request comprising a request for the first server to send the resource to the image processing device;
    obtaining, at the first server from a second server, information that identifies a component installed on the image processing device as a replacement component, the second server separate from the image processing device;

obtaining, at the first server from a third server, information indicating a count value of a counter associated with the component the third server separate from the image processing device;

determining, at the first server, that the counter has not been reset based on the count value of the counter being at least a predetermined value; and in response to determining that the counter has not been reset, sending, from the first server to the image processing device based on the request, the resource including information for presentation as an interface element in a graphical user interface on a display of the image processing device, the interface element enabling a user to reset the counter by selecting the interface element.

11. A system comprising:

one or more processors; and one or more computer-readable media coupled to the one or more processors, the one or more computer-readable media storing instructions that, when executed by the one or more processors, cause the one or more processors to perform operations comprising:

receiving, at a first server from an image processing device, a request to access a resource, the request comprising a request for the first server to send the resource to the image processing device;

obtaining, at the first server from a second server, information that identifies a component installed on the image processing device as a replacement component, the second server separate from the image processing device;

obtaining, at the first server from a third server, information indicating a count value of a counter associated with the component, the third server separate from the image processing device;

determining, at the first server, that the counter has not been reset based on the count value of the counter being at least a predetermined value; and in response to determining that the counter has not been reset, sending, from the first server to the image processing device based on the request, the resource including information for presentation as an interface element in a graphical user interface on a display of the image processing device, the interface element enabling a user to reset the counter by selecting the interface element.

12. The system of claim 11, wherein the request to access the resource is a request sent to the first server based on one or more user inputs received at the image processing device.

13. The system of claim 11, wherein the request to access the resource is a request sent to the first server in response to the image processing device switching from a first operation mode to a second operation mode, the second operation mode comprising an operation mode for performing component removal and component installation on the image processing device.

14. The system of claim 11, wherein receiving the request to access the resource comprises receiving the request from a browser on the image processing device.

15. The system of claim 11, wherein obtaining the information that identifies the component comprises:

sending, from the first server to the second server, a request for component information associated with the image processing device; and receiving, at the first server from the second server, the information that identifies the component.

16. The system of claim 15, wherein the sending the request for component information associated with the image processing device is performed in response to the receiving, at the first server from the image processing device, the request to access the resource.

17. The system of claim 15, wherein the information that identifies the component comprises inventory data associated with the image processing device.

18. The system of claim 11, wherein obtaining the information indicating the count value of the counter associated with the component comprises:

sending, from the first server to the third server, a request for counter information associated with the image processing device; and receiving, at the first server from the third server, the information indicating the count value of the counter associated with the component.

19. The system of claim 18, wherein the sending the request for counter information associated with the image processing device includes sending, from the first server to the third server, the information that identifies the component.

* * * * *